3,164,468
PHOTOMECHANICAL REVERSAL PROCESS AND FOIL AND DYES FOR USE THEREIN

Mark L. Moskowitz, Endicott, and Ralph G. D. Moore, Chenango Forks, N.Y., assignors to General Aniline & Film Corporation, New York, N.Y., a corporation of Delaware
No Drawing. Filed June 6, 1960, Ser. No. 33,914
12 Claims. (Cl. 96—49)

This invention relates to photomechanical reversal film for the production of reversed color prints suitable for making second generation prints and, more particularly, to the dyes used in the formation of the reversed color prints.

U.S. Patent 2,772,972 describes a process for making an offset printing plate wherein a base such as paper, for example, is first coated with a hydrophobic layer comprising a copolymer of vinyl methyl ether and maleic anhydride, which layer is overcoated with a layer of a water-insoluble, alkali-resistant adhesive resin and a light-sensitive, water-insoluble diazo oxide. The plate thus produced is then exposed under a pattern. The portions of the overcoating which were exposed to light are removed by means of a liquid aliphatic polyhydroxy compound and a hydrophilic character imparted to the hydrophobic layer by treatment with a base such as an alkylolamine soluble in the aliphatic polyhydroxy compound. The light-sensitive materials disclosed in this patent are those derived from the esterification or amidation of 2-diazo-1-naphthol-5-sulfonyl chlorides or 1-diazo-2-naphthol-5-sulfonyl chlorides with amines or alcohols or with such compounds which possess an unsaturated, unconjugated, non-polar molecule such as rosin amines, rosin alcohols and their derivatives.

The preparation of multicolor reversal prints on film by photomechanical means while utilizing light-sensitive materials such as those of U.S. Patent 2,797,213 to establish by the photomechanical means of U.S. Patent 2,772,972 a positive resist over a resin layer which has been made hydrophilic in the exposed and developed areas is described in application Serial No. 742,650, filed June 17, 1958, now U.S. Patent No. 2,993,788. These hydrophilic areas, according to said application, are then dyed with a suitable basic dye or combination of such dyes to produce a reversed image, that is, a positive from a negative original, in almost any desired hue. The residual photosensitive resist layer is then removed with a suitable solvent.

While application Serial No. 742,650, now U.S. Patent No. 2,993,788, states that images of very high visual and actinic opacity can be produced, in actual practice the various commercial basic dyes contemplated by said application, although giving a great variety of visually pleasing colors, do not produce images of sufficient actinic opacity to serve as intermediates for the generation of additional prints.

British Patent 761,728 claims that dyes produced by coupling certain diazotized anilines with an alkaline solution of 2,4-pentanedione absorb the actinic light of a mercury arc very strongly. This property is said to render the dyes useful in the preparation of screens designed to reduce or eliminate such radiation. Unfortunately, however, the chemical nature of these dyes is such that they are not substantive to the hydrophilic surface prepared by the development process of U.S. Patent 2,772,972. Consequently, the quantity of dye taken up by the hydrophilic surface is inadequate to render such surface opaque to actinic light.

We have now found that the substantivity to such hydrophilic surface of an azo dye opaque to actinic light can be enormously increased by incorporating into the diazonium salt from which the dye is made a dialkylaminoalkyl group wherein the alkyl groups are of low molecular weight, i.e., being methyl, ethyl, propyl or the like. The dialkylaminoalkyl group may be directly attached to the aromatic ring of the diazonium salt or may be attached by a bivalent radical such as oxy, thio, imino, carbonyloxy, methylene or the like. In order to maintain the solubility of the dye in the bath at a sufficiently high level to produce dense and uniform dyeings, it is preferred that the coupler in such azo dyes be of low molecular weight such as 2,4-pentanedione, a phenol, an acylacetanilide, a phenylenediamine or a pyrazolone.

The utilization of such dyes to produce reversed images of high visual and actinic opacity permitting the generation from such prints of additional prints constitutes the purposes and objects of the present invention.

Dyes contemplated for use herein have the following general formula:

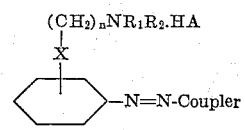

wherein X is oxy, thio, imino, carbonyloxy, or methylene; $R_1$ and $R_2$ are lower alkyl such as methyl, ethyl, propyl or the like; $n$ is a whole number from 1 to 3; HA is an acid such as hydrochloric, acetic, sulfuric, oxalic or the like; and Coupler represents the radical of a low molecular weight coupler such as a 2,4-diketone, i.e., 2,4-pentanedione, a phenol such as 3-aminophenol, resorcinol or the like, an acylacetanilide such as acetoacetanilide or benzoyl acetanilide, a phenylenediamine such as m-phenylenediamine, m-morpholinoaniline, m-pyridylaniline or the like, or a pyrazolone such as 1-phenyl-3-methyl-5-pyrazolone, 1-phenyl-3-ethyl-5-pyrazolone or the like.

The dyes may be used as the free bases but the nature of the bath from which they are applied, preferably an aqueous solution of a polyhydric alcohol such as glycols and glycerol, usually makes necessary the addition of a small amount of an acid such as hydrochloric, acetic, sulfuric, oxalic or the like to convert them to the more soluble salts. The isolation and use of the dyes in the form of such salts are, accordingly, preferred embodiments of the invention and it is for this reason that the dyes have been formulistically represented as above.

The dyes may be prepared by diazotizing the selected substituted aniline and coupling it with the selected coupler in alkaline solution. Many of the substituted anilines are known compounds but in any case may be made by conventional reactions as will appear from the examples. It is also possible to prepare the dyes by diazotizing an aminophenol, reacting the product with a coupler, and then dialkylaminoalkylating the phenolic group in the resulting simple azo dye.

Amines which may be used to prepare the azo dyes in question are:

p-(2-diethylaminoethoxy)aniline
p-(3-diethylaminopropoxy)aniline
p-(2-dimethylaminoethoxy)aniline
p-(3-dimethylaminopropoxy)aniline
p-(2-dipropylaminoethoxy)aniline
p-(2-diethylaminoethylthio)aniline
N-(2-diethylaminoethyl)-p-phenylenediamine procaine
p-(3-dimethylaminopropyl)aniline
p-(3-diethylaminopropyl)aniline
p-(2-dimethylaminoethyl)aniline
p-(2-diethylaminoethyl)aniline Dyes within the scope of the above formula which we have found to be particularly suitable in our invention are:

4-(p-2-diethylaminoethoxyphenylazo)-m-phenylenediamine
4-(p-2-diethylaminoethoxyphenylazo)-3-aminophenol
2-(p-2-diethylaminoethoxyphenylazo)-5-morpholinoaniline hydrochloride
2-(p-2-diethylaminoethoxyphenylazo)-3-hydroxycrotonanilide hydrochloride
3-(p-2-diethylaminoethoxyphenylazo)-4-oxo-2-penten-2-ol and its salts
3-(p-2-diethylaminoethylthiophenylazo)-4-oxo-2-penten-2-ol
3-(p-2-diethylaminoethylaminophenylazo)-4-oxo-2-penten-2-ol
2-(p-2-diethylaminoethylaminophenylazo)-3-hydroxycrotonanilide hydrochloride
2-diethylaminoethyl p-(1-acetyl-2-hydroxy propenylazo)benzoate hydrochloride
3-(p-2-dimethylaminoethoxyphenylazo)-4-oxo-2-penten-2-ol hydrochloride
3-(p-2-dipropylaminoethoxyphenylazo)-4-oxo-2-penten-2-ol
4-(p-3-diethylaminopropoxyphenylazo)-4-oxo-2-penten-2-ol
4-(p-2-dimethylaminoethylphenylazo)-m-phenylenediamine
4-(p-2-dimethylaminoethylphenylazo)-3-aminophenol
4-(p-3-diethylaminopropylphenylazo)-m-phenylenediamine
3-(p-3-dimethylaminopropylphenylazo)-4-oxo-2-penten-2-ol
4-(p-2-diethylaminoethoxyphenylazo)-3-methyl-1-phenyl-5-pyrazolone Films prepared and processed by our preferred method effect a reversal of photographic screened transparencies with a speed and fidelity which compare favorably with high contrast silver halide film. The images are outstanding in their behavior under actinic light. Not only do they possess unrivaled opacity, giving reprints of excellent contrast and resolution, but, in addition, they do not show degradation on prolonged and repeated exposure to such light. This is manifest in their retention of the screen dots and production of half-tone renditions of superlative quality.

The following examples illustrate the invention. It is to be understood, however, that these examples are given by way of illustration only and not by way of limitation.

*Example I*

A high acetyl cellulose acetate film base was coated with a solution of:

| | |
|---|---|
| Acetone | ml__ 60 |
| Ethyl acetate | ml__ 35 |
| 2-methoxyethyl acetate | ml__ 5 |
| Cellulose acetate | g__ 2.4 |
| Poly(methyl vinyl ether: maleic anhydride) | g__ 3.6 | and dried. This film was then sensitized with a solution of:

| | |
|---|---|
| Dioxane | ml__ 9 |
| 4-methyl-2-pentanone | ml__ 99 |
| Polyvinyl acetate | g__ 4.5 |
| N-dehydroabietyl-6(5H)-diazo-5(6H)-oxo-1-naphthalenesulfonamide (U.S. Patent 2,797,213, Examples I and V) | g__ 6.7 |

A sheet of this sensitized foil was exposed under a negative or positive original. The exposed material was wiped for about 10 seconds with a cottom swab wet with a solution of:

| | Ml. |
|---|---|
| 2-aminoethanol | 1.5 |
| 2,2',2''-nitrilotriethanol | 10.0 |
| Glycerol | 25.0 |
| Ethylene glycol | 63.5 |

This treatment removed the exposed sensitizer and hydrolyzed the matelic anhydride-containing copolymer in the underlayer.

The developed foil was immersed for 20 seconds in a solution of:

| | |
|---|---|
| Water | ml__ 79 |
| Ethylene glycol | ml__ 20 |
| 2-aminoethanol | ml__ 1 |
| 4-(p-2-diethylaminoethoxyphenylazo)-m-phenylene diamine | g__ 1 | and then rinsed and wiped dry. The unexposed photoresist was removed by wiping the foil with 4-methyl-2-pentanone to give an orange-colored reversed copy of the original suitable for use as a lithographic master.

The dye 4-(p-2-diethylaminoethoxyphenylazo)-m-phenylenediamine was made by dissolving in 21 ml. of hydrochloric acid, 6 N, and 21 ml. of water, 11.8 g. of p-(2-diethylaminoethoxy)-aniline hydrochloride (see Ray, Burlant & Price, J. Org. Chem. 16, 1424 (1951), and Japanese Patent 4777 (1953): C.A. 49 7004g (1955), for preparation of intermediates). This solution was diazotized below 5° C. by adding ice and 10 ml. of sodium nitrite solution dropwise, and the resulting solution was added to 5.4 g. of m-phenylenediamine in 100 ml. of water. The solution was then treated with saturated sodium acetate solution until no further precipitate formed. The reddish orange dye was collected and recrystallized from water to give 16.5 g. of a product melting at 190-7° C. of the structure:

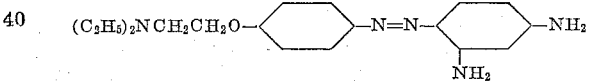

*Example II*

A sensitized film like that used in Example I was exposed under a negative and developed as in Example I. It was dyed by immersion in a solution of:

| | |
|---|---|
| Water | ml__ 79 |
| Ethylene glycol | ml__ 20 |
| 2-aminoethanol | ml__ 1 |
| 4-(p-2-diethylaminoethoxyphenylazo)-3-aminophenol | g__ 1 |

Removal of the unexposed photoresist as in Example I yielded a yellow colored positive copy of the original which could be used for making subsequent whiteprint copies.

The dye 4-(p-2-diethylaminoethoxyphenylazo)-3-aminophenol was prepared by diazotizing p-2-diethylaminoethoxyaniline hydrochloride as described in Example I and adding a volume of the solution equivalent to 0.01 mol to 1.1 g. of m-aminophenol in 25 ml. of water, 10 ml. of 15 N ammonium hydroxide, and about 0.5 ml. of 50% sodium hydroxide. The tar which separated was removed and vacuum dried. The resulting semi-solid was dissolved in 6 N hydrochloric acid and this solution was made alkaline with ammonium hydroxide and treated with a saturated sodium acetate solution. Upon refrigeration a dark solid separated which was collected and vacuum dried. It may be represented by the formula:

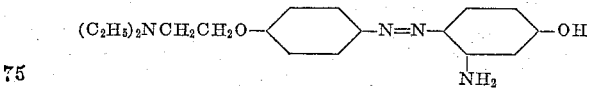

Example III

The dye bath of Example I was supplanted by the following dye bath:

| | |
|---|---|
| Water | ml__ 15 |
| Ethylene glycol | ml__ 7.5 |
| Glycerol | ml__ 7.5 |
| 2-(p-2-diethylaminoethoxyphenylazo)-5-morpholinoaniline hydrochloride | g__ 0.4 | to give reversed copies of the original in a red-orange colored image.

The dye 2-(p-2-diethylaminoethoxyphenylazo)-5-morpholinoaniline hydrochloride was prepared by treating a solution of 2.0 g. of m-morpholinoaniline hydrochloride in 25 ml. of water with a solution of 3.7 g. of p-(2-diethylaminoethoxy)benzenediazonium stannichloride in 50 ml. of water. To the solution was added 5 ml. of saturated sodium acetate solution followed by 2 ml. of 20% hydrochloric acid. The red solution, pH 5, was then made alkaline to precipitate a yellow solid, which was extracted with ether. The ether extract was washed, dried, and treated with hydrogen chloride gas. A purple semi-solid precipitated which was triturated with acetone to give 2.0 g. of the desired dye hydrochloride of the structure:

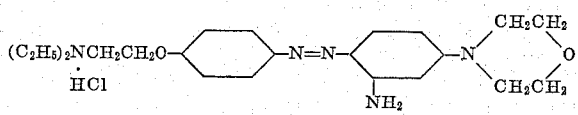

The p-(2-diethylaminoethoxy)benzenediazonium stannichloride was obtained by treating a diazonium solution, prepared as in Example I, with a solution of stannic chloride in water. The resulting precipitate was isolated, washed with water, and dried.

Example IV

A saturated solution of 2-(p-2-diethylaminoethoxyphenylazo)-3-hydroxycrotonanilide hydrochloride (solubility was less than 1.2 g./100 ml. of water:ethylene glycol 1:1) produced a yellow reversed image on foil exposed and developed as in the previous examples.

The dye 2-(p-2-diethylaminoethoxyphenylazo)-3-hydroxycrontonanilide hydrochloride was prepared by droppin a solution of 9.9 g. of p-(2-diethylaminoethoxy)benzenediazonium fluoborate in 50 ml. of water into a solution of 4.4 g. of acetoacetanilide in 50 ml. of water and 4 ml. of 50% sodium hydroxide solution, the reaction temperature being kept below 5° C. The gummy solid was dissolved in a minimum amount of ethanol and hydrogen chloride was passed in to precepitate the desired product of the structure:

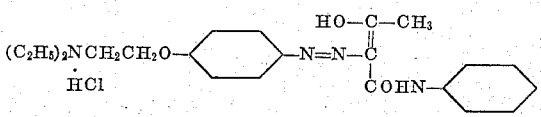

p-(2-diethylaminoethoxy)benzenediazonium fluoborate was made by dissolving the corresponding aniline in a large excess of fluoboric acid, 47%, and diazotizing at 5–15° C. with a five molar aqueous solution of sodium nitrite. The well crystallized product separated after several days refrigeration.

Example V

A dye bath was prepared by stirring 0.2 g. of 3-(p-2-diethylaminoethoxyphenylazo)-oxo-2-penten-2-ol in 25 ml. of ethylene glycol and 25 ml. of water. A few drops of 12 N hydrochloric acid was added and the dye dissolved. 2,2'-iminodiethanol was added dropwise to bring the solution pH to about nine. This solution, used in the manner of previous examples, produced a reversed yellow image which could be used as a master for subsequent reprinting.

The dye 3-(p-2-diethylaminoethoxy-phenylazo)-4-oxo-2-penten-2-ol was prepared by slowly adding a cold solution of 9.9 g. of p-(2-diethylaminoethoxy)benzenediazonium fluoborate, prepared as described in the preceding example, in 50 ml. of water to a cold solution of 2.5 g. of 2,4-pentanedione in 50 ml. of water containing 1.3 ml. of sodium hydroxide, 50% aqueous solution. A yellow precipitate separated, at first oily, later solid. Sodium carbonate solution was added as needed to maintain the pH at about 8. The mixture was stirred for 2–3 hours while warming to room temperature and was then filtered. The product weighed 7.4 g. after isolation and drying, melted at about 110° C., and could be represented by the formula:

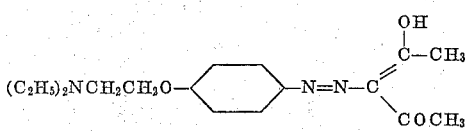

Example VI

A few tenths of a gram of 3-(p-diethylaminoethylthiophenylazo)-4-oxo-2-penten-2-ol in 50 ml. of an equal volume mixture of water and ethylene glycol acidulated with acetic acid gave an orange reversed image when used as in previous examples. The dyed film could be used as a master for making lithographic plates, whiteprint copies or photographic copies.

The dye 3-(p-2-diethylaminoethylthio-phenylazo)-4-oxo-2-penten-2-ol was made by adding a cold solution of 1 g. of p-(2-diethylaminoethylthio)benzenediazonium zincichloride in 20 ml. of water to a cold solution of 0.3 g. of 2,4-pentanedione in 20 ml. of water and 4 drops of sodium hydroxide, 50%. Some sodium carbonate solution, 3 N, was added and after being left cold for some time the red product was isolated and dried. It melted above 300° C. and could be represented by the formula:

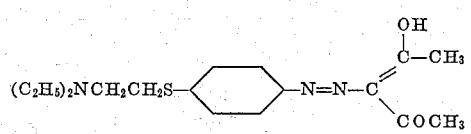

p-(2-diethylaminoethylthio)benzenediazonium zincichloride was prepared by diazotizing p-(2-diethylaminoethylthio)aniline hydrochloride (cf. I. Kh. Fel'dman, Doklady Akad. Nauk S.S.S.R. 65, 857–60 (1949); C.A. 43, 6179) in dilute hydrochloric acid and adding zinc chloride solution. The yellow product melted at 141–2° C. with decomposition.

Example VII

A dye bath consisting of 0.4 g. of 3-(p-2-diethylaminoethylaminophenylazo)-4-oxo-2-penten-2-ol, 7.5 ml. of ethylene glycol, 7.5 ml. of glycerol, 15 ml. of water, and 0.25 ml. of hydrochloric acid, 12 N, gave a yellow image when used to dye developed foils as in the preceding examples.

The above dye was made by reducing with powdered zinc 5.9 g. of N,N-diethyl-N'-p-nitrophenylethylenediamine hydrochloride (J. Chem. Soc. 1947, 914–7) dissolved in 100 ml. of water and 25 ml. of hydrochloric acid, 12 N. The cold filtered solution was diazotized with 5.0 ml. of sodium nitrite solution, 5 N, and added dropwise to 2.5 ml. of 2,4-pentanedione in 100 ml. of water and 25 ml. of sodium carbonate solution, 3 N. Additional carbonate was added as required to keep the mixture alkaline. The yellow product was isolated as usual and is represented by the formula:

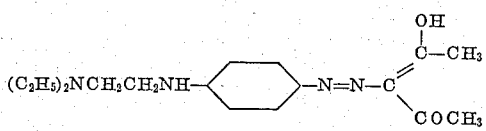

Example VIII

A dye bath of:

Water _____ ml__ 15
Glycerol _____ ml__ 7.5
Ethylene glycol _____ ml__ 7.5
2-diethylaminoethyl p-(1-acetyl-2-hydroxypropenyl-
  azo)benzoate hydrochloride _____ g__ 0.4 was substituted for the bath used in Example I. It yielded a yellow image.

The 2-diethylaminoethyl p-(1-acetyl-2-hydroxypropenylazo)-benzoate hydrochloride

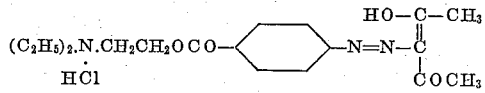

was prepared as follows:

A cold solution of 6.5 g. of procaine hydrochloride in 50 ml. of water and 3 ml. of hydrochloric acid, 12 N, was diazotized with 5 ml. of 5 molar sodium nitrite solution. This solution was then added dropwise to 2.5 g. of 2,4-pentanedione in 50 ml. of water and enough sodium carbonate to maintain the pH at 9. A yellow precipitate formed which was collected, dried, dissolved in about 200 ml. of ethanol, and converted to the hydrochloride by passing in hydrogen chloride. A yield of 3.3 g. of yellow product, presumably of the above structure, was obtained after cooling the solution, filtering, washing with ethanol, and drying.

Example IX

A foil coated and sensitized as in Example I was exposed under a negative original and developed by soaking in a solution of equal parts of ethylene glycol and 3 normal aqueous sodium carbonate. After a rinse with water, the foil was wiped with a damp sponge and immersed in a dye bath containing:

Water _____ ml__ 50
Ethylene glycol _____ ml__ 50
3-(p-2-diethylaminoethoxyphenylazo)-4-oxo-2-
  penten-2-ol hydrochloride _____ g__ 10

The dyed foil was rinsed with water and then wiped with 2-propanol to remove unexposed photoresist, after which it was wiped dry. An orange positive copy of the original was obtained which had outstanding actinic opacity when used as a master for making lithographic plates and whiteprints.

The dye hydrochloride used could be made by dissolving the dye base, obtained as in Example V from a p-(2-diethylaminoethoxy)benzenediazonium salt and 2,4-pentanedione, in isopropyl alcohol and treating the filtered solution with a dry isopropyl alcohol solution approximately 6 molar in hydrogen chloride. The salt separated in excellent yield and was found to melt at 203–5° C. with decomposition. The following formula represents its structure:

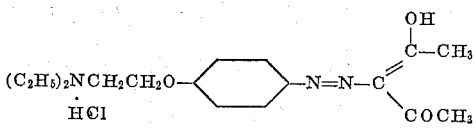

Modifications of the invention will occur to persons skilled in the art. We, therefore, do not intend to be limited in the patent granted except as necessitated by the appended claims.

We claim:

1. A reversed color print suitable for making second generation prints comprising a base, a layer of a copolymer of an alkyl vinyl ether and maleic anhydride on said base, said layer having an image and nonimage portions, said image portions being hydrophilic and dyed with a dye opaque to actinic light and substantive to the hydrophilic surface of the image portions, said dye being selected from the class consisting of those of the following formulae:

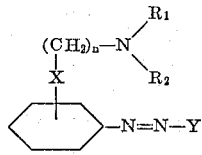

and

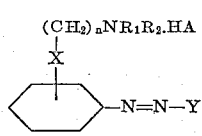

wherein $R_1$ and $R_2$ are both lower alkyl; X is a bivalent radical selected from the group consisting of oxy, thio, imino, carbonyloxy and methylene; A is an anion of an acid; Y is the radical of a low molecular coupling compound wherein cyclic nuclei when present are monocyclic; and $n$ is an integer from 1 to 3.

2. An article as defined in claim 1 wherein Y is selected from the group consisting of a 2,4-diketone, a monocyclic phenol, an acylacetanilide, a phenylenediamine, and a pyrazolone.

3. The article as defined in claim 1 wherein the azo dye is 4-(p-2-diethylaminoethoxyphenylazo)-m-phenylenediamine.

4. The article as defined in claim 1 wherein the azo dye is 4-(p-2-diethylaminoethoxyphenylazo)-3-aminophenol.

5. The article as defined in claim 1 wherein the azo dye is 2-(p-2-diethylaminoethoxyphenylazo)-5-morpholinoaniline hydrochloride.

6. The article as defined in claim 1 wherein the azo dye is 2-(p-2-diethylaminoethoxyphenylazo)-3-hydroxycrotonanilide hydrochloride.

7. The article as defined in claim 1 wherein the azo dye is 3-(p-2-diethylaminoethoxyphenylazo)-4-oxo-2-penten-2-ol.

8. The article as defined in claim 1 wherein the azo dye is 3-(p-2-diethylaminoethylthiophenylazo)-4-oxo-2-penten-2-ol.

9. The article as defined in claim 1 wherein the azo dye is 3-(p-2-diethylaminoethylaminophenylazo)-4-oxo-2-penten-2-ol.

10. The article as defined in claim 1 wherein the azo dye is 2-diethylaminoethyl p-(1-acetyl-2-hydroxypropenylazo)-benzoate hydrochloride.

11. A process of producing a reversed color print which comprises coating a base with a solution comprising a copolymer of alkyl vinyl ether and maleic anhydride and drying to form a layer, overcoating said layer with a solution comprising a mixture of a light-sensitive diazo oxide and a water insoluble resin and drying, exposing the thus formed film under an original, removing the exposed portions of the overcoating, and rendering the portions of the layer therebeneath hydrophilic by treatment with an aqueous solution of a polyhydroxy compound and a base, dyeing the foil with a solution of a dye opaque to actinic light and substantive to the hydrophilic material of said layer and selected from the class consisting of those of the following formulae:

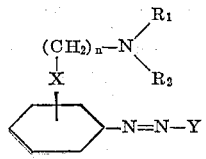

and

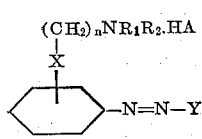

wherein $R_1$ and $R_2$ are both lower alkyl; X is a bivalent radical selected from the group consisting of oxy, thio, imino, carbonyloxy and methylene; A is an anion of an acid; Y is the radical of a low molecular coupling compound wherein cyclic nuclei when present are monocyclic; and $n$ is an integer from 1 to 3, and removing the unexposed portions of said overcoating.

12. A process as recited in claim 11 wherein Y is selected from the group consisting of a 2,4-diketone, a monocyclic phenol, an acylacetanilide, a phenylenediamine and a pyrazolone.

References Cited in the file of this patent

UNITED STATES PATENTS

| 2,405,523 | Sease et al. | Aug. 6, 1946 |
| 2,537,097 | Slifkin | Jan. 9, 1951 |
| 2,551,133 | Jennings et al. | May 1, 1951 |
| 2,680,074 | Sus | June 1, 1954 |
| 2,772,972 | Herrick et al. | Dec. 4, 1956 |
| 2,837,430 | Goldberg et al. | June 3, 1958 |
| 2,887,376 | Tupis | May 19, 1959 |
| 2,993,788 | Straw et al. | July 25, 1961 |

FOREIGN PATENTS

| 761,728 | Great Britain | Nov. 21, 1956 |